United States Patent Office 3,454,388
Patented July 8, 1969

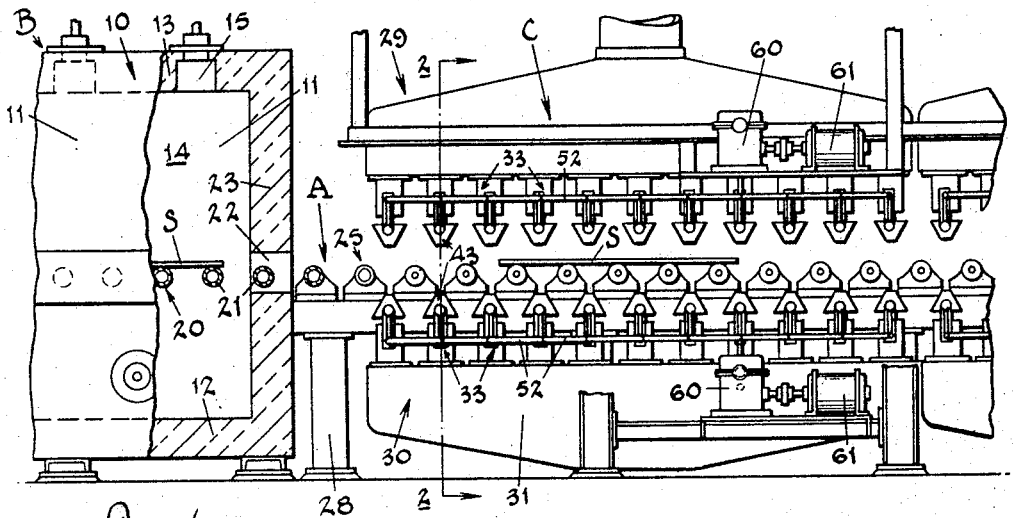
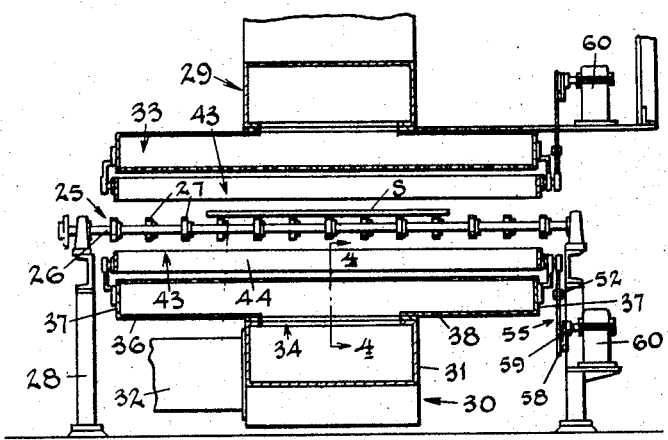
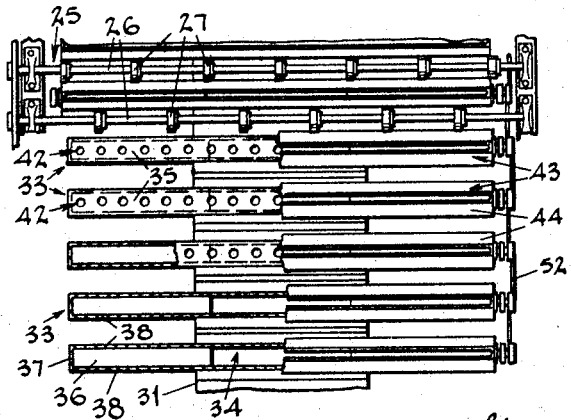

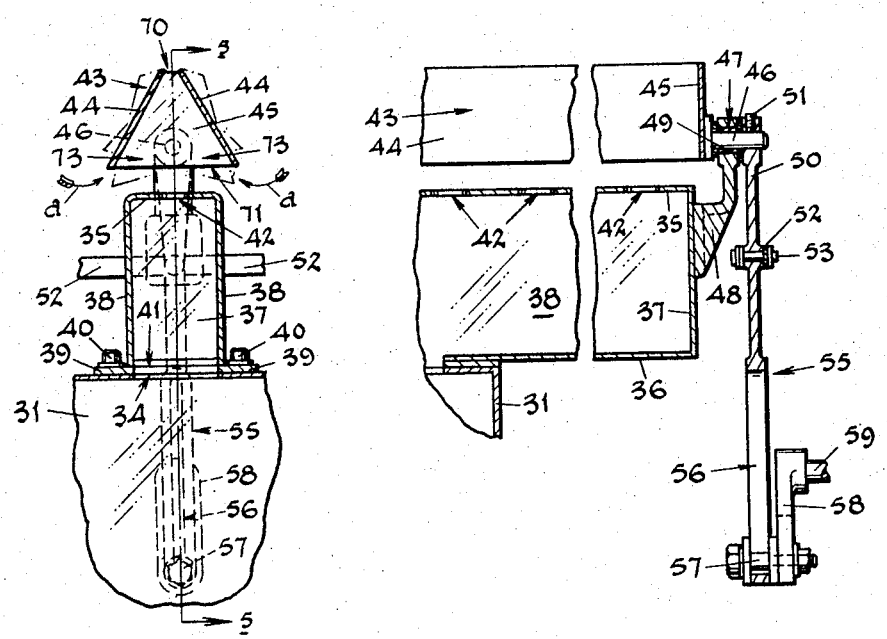

3,454,388
OSCILLATORY SPRAY TEMPERING APPARATUS
George F. Ritter, Jr., Toledo, Ohio, assignor to Libbey-Owens-Ford Glass Company, Toledo, Ohio, a corporation of Ohio
Filed June 28, 1965, Ser. No. 467,477
Int. Cl. C03b 27/00
U.S. Cl. 65—348                                 4 Claims

ABSTRACT OF THE DISCLOSURE

Apparatus for tempering glass sheets, with pressurized air including spaced plenum chambers having a series of openings arranged in a plurality of spaced parallel rows extending transversely of the sheet, and a hood spaced in front of and coextensive with each row of openings and having a relatively narrow slot for directing the air against the sheet and means for oscillating the hoods to cause the air to sweep the surfaces of the glass sheet.

---

This invention relates broadly to the tempering of sheet material and more particularly to new and improved method and apparatus for tempering glass sheets or plates.

It is common practice in the tempering of glass sheets to first heat the sheet in a furnace to substantially the point of softening of the glass and then to suddenly chill the heated sheets to place the outer surfaces thereof under compression and the interior under tension. By following this procedure the mechanical properties of the sheets may be improved so as to increase the physical strength of the glass and to modify its breaking characteristics so that when a tempered glass sheet is broken it will shatter or disintegrate into relatively small, harmless particles rather than large pieces having jagged edges.

The sudden chilling of the heated sheets to produce the desired stresses in the glass is effected by quenching or flushing the opposed surfaces of the glass sheet with a continuous supply of cooling medium or gases. For this purpose, it is desirable that a large supply of relatively low-pressure cooling gases be directed against the surfaces of the glass sheets. Also, it is known that as the thickness of the glass sheet decreases, to provide the desired temper, the rate of cooling of the glass surfaces should be increased by increasing the volume of the cooling medium being directed against the surfaces thereby accelerating the flushing action.

The volume of relatively low-pressure cooling gases which may be made available for the tempering operation is limited by the size of equipment used to deliver the gases to the sheets and the size of this equipment, in turn, is limited by the space available adjacent the glass sheets.

The primary aim of this invention is to provide a method of and means for obtaining a large supply of tempering cooling medium adjacent the surfaces of a glass sheet or plate to be tempered.

Another object is to provide a large volume of tempering cooling medium utilizing a limited amount of space adjacent the sheets to be tempered.

A further object is to accomplish the foregoing by directing streams of cooling gases from a high-pressure supply source toward the sheet and by creating an area of negative pressure surrounding said stream whereby gases from the ambient atmosphere are drawn into the streams by aspiration increasing the volume of cooling gases flowing against the surfaces of the sheets to be tempered.

Other objects and advantages of the invention will become more apparent during the course of the following description when read in connection with the accompanying drawings.

In the drawings, wherein like numerals are employed to designate like parts throughout the same:

FIG. 1 is a side elevation view partially in section of a tempering apparatus embodying the novel features of the present invention;

FIG. 2 is a transverse sectional view taken along lines 2—2 of FIG. 1;

FIG. 3 is a fragmentary plan view of the sheet supporting and conveying means including the cooling means constructed in accordance with the invention;

FIG. 4 is a transverse sectonal view taken along lines 4—4 of FIG. 2; and

FIG. 5 is a fragmentary sectional view taken along lines 5—5 of FIG. 4.

In the commercial production of tempered glass sheets, the sheets are heated and subsequentially chilled in a substantially continuous procedure. To this end, the sheets are successively moved along a path through a heating area where they are heated substantially to the point of softening of the glass and are thereafter moved into and through a chilling area where the sheets are quenched to reduce the temperature at a rapid rate to produce the desired stresses in the glass.

For the purpose of illustration, the novel features of the present invention are shown in the drawings incorporated in an apparatus particularly adapted for use in the production of tempered glass sheets by the continuous procedure described above. This apparatus includes a continuous conveying system A adapted to support a plurality of sheets S in a horizontal plane for movement along a substantially horizontal path through a heating section B and a tempering section C.

In the illustrated embodiment, a tunnel-type furnace 10 is utilized in the heating section and includes side walls 11, a bottom wall 12, and a top wall 13 defining an elongated heating chamber 14. The chamber 14 may be heated in any desired manner by suitable means, such as burners 15, located in the side walls and top wall of the furnace. The heating means are suitably controlled by apparatus (not shown) to obtain the desired temperature at various points in the heating chamber. The sheets S are carried through the heating chamber 14 of the furnace on a conveyor 20, which forms part of the conveying system A, and includes a plurality of spaced rollers 21, suitably journaled in the side walls of the furnace.

In operation, a plurality of sheets are loaded on the conveyor 20 at the entrance end of the furnace (not shown) and heated to the desired temperature during their passage therethrough, after which the heated sheets then pass through an opening 22 located in the end wall 23 of the furnace and are received on a second conveyor 25, also part of the conveying system A. The second conveyor 25, located in the tempering section C, is mounted on a base 28 and includes a plurality of shafts 26 rotatable about parallel axes extending transversely of the path with each shaft having rolls 27, axially spaced apart along the shaft, fixedly secured thereto with the rolls being covered with a suitable heat-resistant refractory material. The spaced rolls on each shaft reduce the area of contact of the rolls with the sheet surface thereby minimizing scratching and marring of the sheet surface and allowing the major area of the lower surface of the sheet to be in direct communication with the cooling medium directed thereagainst. The shafts 26 are rotatably driven in common by a conventional power drive means (not shown) to move the sheets through the tempering section C. Cooling means 29 and 30 are located in the tempering section C and disposed above and below the path of movement of the sheets to direct cooling gases against the opposed faces of the sheet. Since the upper and lower cooling means are identical in construction, only one will be described in detail herein.

As noted above, the magnitude of the stresses or degree of temper imparted to the glass is dependent upon the rate of which the sheet is cooled from the elevated bending temperatures. This rate of cooling depends to a large extent upon the volume of cooling gases flowing across the surfaces of the sheet thereby absorbing heat from the glass and carrying this heat away from the sheet.

To facilitate more rapid cooling of the sheet, the present invention contemplates increasing the volume of cooling gases flowing across the sheet surfaces by directing streams of these gases from a high-pressure supply source toward the surfaces to be cooled in such a manner as to create an area of negative pressure adjacent the streams so that the quantity of gases in these streams will be supplemented by gases aspirated from the surrounding atmosphere. In this way, the equipment needed for delivering the cooling gases to the sheets need only be of sufficient size to carry the gases emanating from the high-pressure supply source. At the same time, however, a large volume of gases is made available at the sheet surfaces for cooling purposes.

To this end, in accordance with the present invention, novel cooling means are provided for utilizing relatively small quantities of gases at high pressure to provide large volumes of relatively low-pressure gases at the sheet surface by supplementing the quantity of high-pressure gases with gases drawn from the ambient atmosphere.

Herein, this means comprises a plurality of manifolds or headers disposed adjacent the surfaces of the sheets to be cooled and having restricted openings or orifices therein and facing the surfaces of the sheet, through which orifice streams of gases may be directed from the manifolds toward the sheet surfaces. Aspirating means are carried by the manifolds adjacent the orifices so that the streams of cooling gases flowing therethrough create areas of negative pressure surrounding the streams resulting in additional gases in the atmosphere being drawn into the streams and delivered to the surfaces of the sheets to be cooled.

As best shown in FIGS. 1 to 3, herein the cooling means 30 includes a plenum chamber 31 extending along said path in said cooling section C, which chamber is connected by means of a conduit 32 to a source (not shown) of a cooling medium maintained under high pressures; the cooling medium being air in the illustrative embodiment. A plurality of manifolds or headers 33 communicating with the plenum 31 through openings 34 therein are disposed adjacent the path of movement of the sheets and are provided with means for directing streams of cooling air outwardly of the manifold and toward the sheets moving along the path.

As will be appreciated, effective cooling of the sheet depends not only upon providing sufficient cooling air flowing over the surface of the sheet to absorb the heat therefrom, but also upon providing sufficient opportunity for this then spent air to escape away from the surface of the sheets permitting the fresh cool air flowing from the manifolds to impinge upon and flow freely across these surfaces.

For this purpose, in accordance with another aspect of this invention, the cooling means by which the cooling air is delivered to the sheets is so constructed as to provide sufficient area for the heated air to escape away from the sheets. By utilizing relatively small quantities of primary air at comparatively high pressures, the equipment required to deliver this air to a point adjacent this path may be restricted in size to insure sufficient space adjacent the path for the provision of the above-mentioned areas of escape for the heated air.

To these ends, in the present instance the plenum 31 extends along the center of the path and each of the manifolds communicating therewith comprises relatively long, narrow tubes extending transversely across the path and laterally outwardly on each side of the plenum 31.

The manifolds are spaced apart along the path thereby providing escape areas between the adjacent manifolds.

Each manifold 33 (FIG. 4) includes a top wall 35, a bottom wall 36, end walls 37 and side walls 38 provided with flanges 39 connected to the plenum chambers by means of securing devices 40. The bottom wall of each manifold is provided with the opening 34, while the top wall has a plurality of relatively small openings or orifices 42 located along the length thereof. An elongated hood or nozzle 43, formed by inclined side walls 44 and end walls 45, has shafts 46 extending from the end walls thereof which are journaled in openings 47 formed in brackets 48 secured to the end walls of the manifold 33. The openings may be provided with suitable bearing surfaces 49 to reduce the amount of wear between the respective elements.

Each of the shafts 46 extend through the brackets at one end of the hood and are provided with shaft extensions 50 secured thereto by means of setscrews 51. The shaft extensions are interconnected by a coupling bar 52 pivotally secured to each shaft by a bolt 53. One of the shaft extensions is provided with an integral extending drive member 55, having an elongated slot 56 therein for slidably receiving a bolt 57 connected to a crank 58 which in turn is secured to an output shaft 59 of a transmission unit 60. The transmission unit is supplied with a suitable power source 61 to oscillate each of the hoods or nozzles in common about the shafts 46 located in the brackets 48.

With particular reference to FIG. 4, it can be seen that the inclined side walls of the hood form an elongated narrow passageway terminating in a slot 70 adjacent the path, which communicates with the orifices 42 through the opposite open side 71 of the hood. The flow of the relatively high-pressure air is directed through the orifices 42 into the open side 71 of the hood, through the passageway and the slot 70 creating a negative pressure area 73 which will draw air from the atmosphere surrounding the hood into the open side 71 along a path indicated by the arrows $a$. It has been found that this novel arrangement considerably increases the volume of air delivered to the glass surface; for example, approximately fifty percent of the air is drawn or aspirated from the atmospheric air. Also, as noted above by using the high-pressure air source, the size of the equipment required adjacent the glass surface to deliver the air occupies less space thereby permitting the spacing between the manifolds to be increased allowing greater quantities of heated spent air to escape from the glass surface.

The particular mounting of the nozzles on the manifold will allow the nozzle or more specifically the slot to oscillate about the shafts 46 as an axis. More specifically, rotation of the shaft 59 by the power source 61 through the transmission unit will rotate the bolt 57 which is guided in the slot 56. This will turn the shafts 46 back and forth in the opening 47 in the bracket which in turn will oscillate the slot about the shafts 46, acting as a pivot. Therefore the streams of cooling medium will be continually impinged on different points of the surface of the moving or stationary glass without creating areas of low and high strain in the finished glass sheet. The above arrangement will more uniformly cool the entire surface of the sheet resulting in more equal stresses being imparted to the sheet.

Although in the illustrated embodiment the novel cooling means has been shown to be utilized in the tempering of flat glass sheets, it is readily apparent that the surfaces of the cooling means may be contoured to conform to the curvature of a glass sheet and thereby be readily utilized to temper curved sheets.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. Apparatus for tempering glass sheets comprising, in combination, means for supporting a heated sheet of glass to be tempered in a fixed plane for movement along a fixed path, plenum chambers disposed at opposite sides of said plane, each of said plenum chambers being provided with a series of openings arranged in a plurality of spaced parallel rows extending transversely of said path and facing said plane, means for introducing air under pressure into said plenum chambers from which it passes through the openings therein, an elongated hood mounted in front of and coextensive with each row of openings, each hood having an open side facing the respective plenum chamber and a relatively narrow slot at the opposite side adjacent the plane of the sheet, said hoods being positioned adjacent to but spaced from the respective plenum chamber, whereby the pressurized air passing from the plenum chamber into the hoods serves to draw air from the atmosphere into said hoods by aspiration to increase the volume of air directed through said elongated slot and against the glass sheet.

2. Apparatus for tempering glass sheets as defined in claim 1, including means for mounting each hood to rock about a fixed axis parallel to said plane and transversely of said path, and means for oscillating said hoods about their respective axes to cause the air discharged from the slots therein to sweep the surfaces of the sheet in a direction parallel to the movement thereof.

3. Apparatus for tempering glass sheets comprising, in combination, means for supporting a heated sheet of glass to be tempered in a horizontal plane and for conveying said sheet along a substantially horizontal path, stationary plenum chambers disposed above and beneath said path, each of said plenum chambers being provided with a plurality of manifolds extending transversely of said path and spaced apart along said path, each of said manifolds communicating with the respective plenum chamber and having a series of restricted apertures arranged in a plurality of spaced parallel rows extending transversely of and opening towards said path, a plurality of elongated hoods coextensive with said rows, one being located in front of each manifold and having inclined side walls defining a passageway terminating in an elongated narrow slot adjacent said path, means supplying air under pressure to the plenum chamber, which air flows outwardly through said apertures into the passageways in said hoods and thence from said slots against the glass sheet, each hood being located adjacent to but spaced from the respective manifold, whereby the pressurized air passing from the manifold into the hoods will draw air from the atmosphere into the passageways by aspiration to increase the volume of air flowing through said slots and directed against the glass sheet.

4. Apparatus for tempering glass sheets as defined in claim 3, including means for mounting each of said hoods on said manifolds to rock about a fixed axis transverse to said path and parallel to said plane, and means for oscillating said hoods about said axes to cause the air discharged from the slots therein to sweep the surfaces of the glass sheet.

References Cited

FOREIGN PATENTS 441,017 6/1936 Great Britain.
626,078 1/1936 Germany.

DONALL H. SYLVESTER, *Primary Examiner.*

A. D. KELLOGG, *Assistant Examiner.*

U.S. Cl. X.R.

65—115, 351